United States Patent
Lev et al.

[11] Patent Number: 6,043,633
[45] Date of Patent: Mar. 28, 2000

[54] POWER FACTOR CORRECTION METHOD AND APPARATUS

[75] Inventors: Arie Lev, Rehovot; Yoel Sharaby, Mevasseret Zion; Daniel Rubin, Nes Ziona; Moshe Kalichstein, Tel Aviv, all of Israel

[73] Assignees: Systel Development & Industries; International Rectifier Corp.

[21] Appl. No.: 09/092,270

[22] Filed: Jun. 5, 1998

[51] Int. Cl.[7] .............................. G05F 1/56; H02M 3/18
[52] U.S. Cl. .............................................. 323/222; 363/60
[58] Field of Search .................................. 323/282, 283, 323/284, 285, 222, 223; 363/60

[56] References Cited

U.S. PATENT DOCUMENTS

| | | | |
|---|---|---|---|
| 5,359,274 | 10/1994 | Bandel | 323/207 |
| 5,594,323 | 1/1997 | Herfurth et al. | 323/285 |
| 5,614,811 | 3/1997 | Sagalovich et al. | 323/207 |
| 5,757,635 | 5/1998 | Seong | 363/89 |

OTHER PUBLICATIONS

Andreycak, B., "Power Factor Correction Using the UC3852 Controlled On–Time Zero Current Switching Tecxnique", Unitrode Application Note, pp 10–269–10–275, no futher information given.
Alberkrack et al, "An Economical Controller Corrects Power Factor", *Power Conversion*, pp 322–329, Sep. 1992 Proceedings.

*Primary Examiner*—Adolf Deneke Berhane
*Attorney, Agent, or Firm*—Mark M. Friedman

[57] ABSTRACT

A method and apparatus for controlling a boost converter, which offers improved power factor correction by compensating for the distorting effects of parasitic capacitance and parasitic oscillations. By precise adjustments to the closing time of the boost switch, the effects of parasitic capacitance can be reduced or eliminated. A zero current detector capable of detecting both forward and reverse zero current points facilitates the compensation. The method and circuit of the present invention are well-suited to integration with an inexpensive digital controller such as a microprocessor, and a method of dithering to enhance the time resolution of clocked digital circuits is presented.

14 Claims, 9 Drawing Sheets

POWER FACTOR CORRECTION METHOD AND APPARATUS

FIELD AND BACKGROUND OF THE INVENTION

The present invention relates to a method and apparatus for active power factor correction, and, more particularly, to an improved method and apparatus for critical mode and discontinuous mode control of boost converters.

Power factor is a measure of the efficiency of electrical utilization by electrical loads. Because instantaneous electrical power equals the current multiplied by the voltage, an electrical load which draws a large current at a low voltage and which sustains a high voltage while drawing little current does not utilize the power delivery capabilities of its power supply efficiently. For maximum efficiency, a load should always draw a current that is proportional to the voltage applied across the load. That is, the load should appear as a resistive impedance to the power supply. For a purely resistive load, the power factor equals unity, whereas for loads which depart from this ideal behavior the power factor will be less than one. A low power factor is undesirable from a standpoint of equipment and power main utilization, and in most cases it is necessary to provide means of increasing a low power factor toward unity.

For inductive or capacitive loads, power factor correction is usually accomplished by the use of passive components which eliminate high-order harmonics and reduce the first harmonic phase difference between the voltage and current to as close to zero as possible. At higher frequencies, however, the problem of total harmonic distortion becomes more important than phase shift, and active electronic means are needed to perform the correction. This is especially true in cases involving non-linear loads. Power supplies, for example, particularly high-frequency power supplies, create severe total harmonic distortion which leads to a low power factor.

This problem associated with total harmonic distortion and the reduction of power factor is illustrated in FIG. 1, to which reference is now briefly made. FIG. 1 illustrates the input voltage and current waveforms as functions of the time t for a device which rectifies alternating current and charges a capacitor. This is a common configuration for power supplies. In FIG. 1 a full-wave rectified input voltage $V_{in}$ which has been smoothed by a capacitor produces a filtered voltage waveform 2. When input voltage $V_{in}$ falls, the capacitor sustains the output voltage during a capacitor discharging interval 4. When input voltage $V_{in}$ rises, however, the capacitor charges during a capacitor charging interval 6. During capacitor charging interval 6, an input current $I_{in}$ exhibits highly-distorted sharp-peak current drains. The resulting waveform of input current $I_{in}$ therefore is not proportional to input voltage $V_{in}$, and associated with the total harmonic distortion caused by the sharp pulses of input current $I_{in}$ is a reduced power factor. The goal of active power factor correction in such cases is to shape the input current waveform to have the same shape as the waveform of the input source voltage.

A common means of shaping the input current waveform to be proportional to the input voltage waveform is to use a boost converter. The basic topology of prior art boost converters is shown in FIG. 2, to which reference is now made. This topology is referred to as the "boost topology."

A boost converter is a type of DC-to-DC power converter whose output voltage at a load $Z_L$ is higher than the voltage of the power source $V_{in}$ connected to the input. It operates through cycles of charging and discharging energy into inductor 10 in the form of inductor current $I_{in}$. A small input capacitor $C_{in}$ 13 is used to filter the input current, and a large output capacitor $C_{out}$ 15 is used to keep a constant output voltage. The operating cycle starts when a boost switch 14 is closed and current $I_{in}$ from the power source $V_{in}$ starts to build up the magnetic field in inductor 10. When the current reaches a value as determined by an external controller (not shown in FIG. 2), boost switch 14 is opened, at which point the collapsing magnetic field of inductor 10 generates a voltage at a point 11. When the current $I_{in}$ collapses to a value determined by the external controller, or if boost switch 14 was opened for a time determined by the external controller, boost switch 14 is closed and the cycle starts again.

The present application uses the terms "closed" and "on" equivalently to denote a state of a switching device wherein the switching device conducts electric current, and uses the terms "opened" and "off" equivalently to denote a state of a switching device wherein the switching device does not conduct electric current. The present application uses the term "closing" to denote the action of putting a switching device into the closed state, and uses the term "opening" to denote the action of putting a switching device into the opened state. The present application uses the term "inductive charging" to denote the driving of current through an inductor by an external voltage in order to build a magnetic field. The present application uses the term "inductive discharging" to denote the driving of current by an inductor due to the collapse of the inductor's magnetic field. Once boost switch 14 is opened, the current driven by inductor 10 flows into load $Z_L$. Inductor 10 is able to generate voltages in excess of $V_{in}$, which can result in the storage of energy in load $Z_L$ if load $Z_L$ has a reactive component. Therefore, a diode 12 is placed before an output capacitor $C_{out}$ 15 in order to prevent current from flowing out of load $Z_L$ and back into inductor 10. Although the relationship between output voltage $V_{out}$ and output current $I_{out}$ is determined by the nature of load $Z_L$, the power factor is not concerned with the output parameters of the boost converter, but rather with the input parameters of the boost converter. Therefore, by carefully regulating the closing and opening of boost switch 14, it is possible to shape the waveform of input current $I_{in}$ so that input current $I_{in}$ is always proportional to the waveform of input voltage $V_{in}$, and thereby to keep the power factor at or near unity.

It is noted that the boost topology relies on the principle of pulse-width modulation, wherein the duty cycle of the boost switch is altered by varying the respective time intervals of the pulses corresponding to the closed and opened states. The present application uses the term "duty cycle" to denote a repeated sequence of two alternating states, each state of which has a specified time interval. The present application uses the term "pulse-width modulator" ("PWM") to refer to any circuit which performs pulse-width modulation. The present application uses the term "time interval" to denote a period or duration of time as distinct from the occurrence of an instant of time. Both the start and end of a time interval are instants of time, and the time interval is the period of time between them.

There are three principal operating modes for a boost converter. operating modes are distinguished by how current flows through inductor 10 (FIG. 2). One operating mode is referred to as the "continuous mode," wherein input current $I_{in}$ flows without interruption in the same direction through inductor 10. The waveforms of the continuous mode are illustrated as functions of time t in FIG. 3 for an input current $I_{in}$ which closely follows the waveform of a rectified voltage $V_{in}$. Although current $I_{in}$ flows continuously, the magnitude and slope of current $I_{in}$ with respect to t will change sign as boost switch 14 (FIG. 2) is opened and closed. A second operating mode is referred to as the "discontinuous mode," wherein input current $I_{in}$ periodically stops flowing and remains off for a certain time interval. The waveforms of the discontinuous mode are illustrated as functions of time t in FIG. 4 for an input current $I_{in}$ which closely follows the waveform of a rectified voltage $V_{in}$. Between each activation of boost switch 14 (FIG. 2), there is a time interval during which input current $I_{in}$=0. The third operating mode is referred to as the "critical mode," wherein input current $I_{in}$ falls to zero and then immediately begins to flow again. The waveforms of the critical mode are illustrated as functions of time t in FIG. 5 for an input current $I_{in}$ which closely follows the waveform of a rectified voltage $V_{in}$. In the ideal case for the critical mode, even though input current $I_{in}$ decreases to zero at a point between each activation of boost switch 14 (FIG. 2), current $I_{in}$ immediately begins to increase so that there is no period during which input current $I_{in}$ remains zero. (The switching frequency is shown in FIG. 3, FIG. 4, and FIG. 5 as being of the order of the frequency of the input voltage $V_{in}$ for the purposes of illustration only, and in actual practice the switching frequency is much higher than depicted in the figures.) In all three of these operating modes the waveform of the average value of input current $I_{in}$ has the same shape as the waveform of input voltage $V_{in}$ and therefore has a power factor at or near unity. In the discontinuous mode (FIG. 4) and in the critical mode (FIG. 5), the instantaneous value of input current $I_{in}$ has a triangular waveform whose base is at zero current. The average value of input current $I_{in}$ at any point is given by the area of the triangular portions up to that point. For the critical mode, the triangular portions touch one another, and therefore the average input current $I_{in}$ for the critical mode is equal to half the height of the triangular portions. For the discontinuous mode, the triangular portions do not touch one another, and therefore the average input current $I_{in}$ for the discontinuous mode is less than half the height of the triangular portions.

The continuous mode is typically used for high power applications. A drawback of the continuous mode is that a high reverse current flows briefly through diode 12 and boost switch 14 (FIG. 2) until diode 12 recovers, thereby putting stress on diode 12. Another drawback of the continuous mode is that inductor 10 must have a high value of inductance. A further drawback of the continuous mode is that it generally requires an analog multiplier for regulating the cycle by which boost switch 14 is operated, and this adds complexity and cost to the implementation.

The discontinuous mode is useful at low power levels. Diode 12 recovers at zero current and there is therefore no stress on diode 12 and boost switch 14. However, the drawback to the discontinuous mode is that there is usually an associated high ripple current.

The critical mode is the most commonly-used operating mode for boost converters. As with the discontinuous mode, diode 12 (FIG. 2) recovers with zero current and therefore there is no stress on diode 12. The critical mode, however, has the capability of controlling higher power than the discontinuous mode and has a lower ripple current. The critical mode also has advantages over the continuous mode. The critical mode is easier to implement than the continuous mode, and the critical mode offers better feedback loop stability and can utilize a smaller inductor. In order to operate a boost converter in the critical mode, it is necessary to detect when input current $I_{in}$ reaches zero. The time when input current $I_{in}$ reaches zero is the instant at which boost switch 14 (FIG. 2) must be closed. The present application uses the term "forward inductor current" to denote the current which flows in an inductor in the direction preferred by the externally applied voltage, and uses the term "zero forward inductor current" to denote the condition which occurs when the instantaneous forward inductor current falls to zero. The present application uses the term "reverse inductor current" to denote the current which flows in an inductor opposite to the direction preferred by the externally applied voltage, and uses the term "zero reverse inductor current" to denote the condition which occurs when the instantaneous reverse inductor current falls to zero.

Unfortunately, although boost converters are able to perform power factor correction efficiently for a variety of loads, certain deficiencies of the prior art zero-detection method for critical mode operation lead to a residual total harmonic distortion at low power levels, caused by parasitic oscillations resulting from parasitic capacitance in the components of the boost converter. These low power levels occur at small loads, and they also occur during the normal operating cycle at the points when the input voltage $V_{in}$ waveform (FIG. 5) comes near zero volts. When total harmonic distortion increases from this effect, the power factor correction becomes less efficient. Therefore, it would be highly advantageous to have a method and apparatus which is able to eliminate the residual total harmonic distortion that occurs at low power levels by compensating for the parasitic capacitance in the components of the boost converter. This goal is met by the present invention.

Furthermore, the techniques used in the prior art to implement a zero current detector are not wholly satisfactory. For example, inductor 10 (FIG. 2) may be provided with a secondary coil, to function as a flyback transformer for sensing the collapse of the magnetic field and thereby providing a zero current detector which can detect zero forward inductor current (J. H. Alberkrack and S. M. Barrow, "An Economical Controller Corrects Power Factor", *Power Conversion*, September 1992 Proceedings, p. 322–329). Techniques such as this, however, can involve significant additional expense in a low-cost circuit for power factor correction, and moreover are limited to detecting the zero forward inductor current. To compensate for the effect of the parasitic capacitance of a boost converter, it is desirable to also detect zero reverse inductor current. Therefore, it would be highly advantageous to have a less expensive method for implementing a zero current detector which can detect both zero forward inductor current and zero reverse inductor current. This goal is also met by the present invention.

Moreover, it is desirable to be able to utilize certain types of digital circuits in pulse-width modulators because of their versatility and low cost. In particular it is highly desirable to be able to utilize clocked digital circuits, including but not limited to microprocessors and microcontrollers, in pulse-width modulators. The present application uses the term "clocked digital circuit" to denote any electrical circuit which is synchronized by, triggered by, or which otherwise operates in accordance with discretely timed clock signals that repeat at regular time intervals. Unfortunately, although clocked digital circuits are able to output control signals having durations of calculated time intervals, the calculated time intervals output by a clocked digital circuit are constrained to always be multiples of a basic time interval which is equal to the period of the clock which drives the clocked digital circuit multiplied by the number of clock cycles required for the relevant operations. The present application uses the term "resolution" to denote the minimum time interval which a clocked digital circuit can output. For example, if a clocked digital circuit has a clock period of 500 nanoseconds and requires 10 clock cycles to perform a particular timing operation, then the time intervals which can be output by this clocked digital circuit will be limited to time intervals which are multiples of 5 μsec, and hence the resolution of this clocked digital circuit is 5 microseconds. Such a clocked digital circuit is able to output time intervals such as 5 microseconds, 10 microseconds, 15 microseconds, 20 microseconds, and so forth, but is not able to output time intervals such as 6 microseconds, 13.5 microseconds, 17 microseconds, or 19 microseconds. For effective power factor correction, however, it may be necessary to be able to adjust the time intervals of a duty cycle to a finer resolution than an otherwise suitable clocked digital circuit can attain. This goal is also met by the present invention.

SUMMARY OF THE INVENTION

According to the present invention there is provided an innovative zero current detector which is easy and inexpensive to implement. Moreover, the zero current detector of the present invention allows detecting both zero forward inductor current and zero reverse inductor current. This allows detecting the zero current points of the parasitic oscillations of the parasitic capacitance in the components of the boost converter, and according to the present invention there is also provided an innovative method of compensating for this parasitic capacitance. To compensate for the effect of the parasitic capacitance on waveform shape it is necessary to dynamically adjust the timing of the closing of boost switch 14 (FIG. 2) pulse by pulse according to the $V_{in}$ level and the period of the resulting parasitic oscillations as well as the timing of the opening of boost switch 14 (FIG. 2) according to the energy storage in the parasitic capacitance, and the method according to the present invention provides for such adjustment.

Furthermore, because an optimized operating mode of a boost converter needs to be changed according to changing $V_{in}$ and load conditions, according to the present invention there is provided a method for control of the boost converter with dynamically adaptive operating mode (critical or discontinuous) and control characteristics (feedback poles) by decision according to $V_{in}$ and load conditions by means of choosing appropriate predefined algorithms and parameters. Aspects of the digital control of the present invention include the determination of the proper closed and opened time intervals for boost switch 14 (FIG. 2). Using a digital microcontroller to determine the closed and opened time intervals eliminates the need for separate analog circuitry to perform this critical task, thereby simplifying construction and reducing cost. According to the present invention, moreover, there is also provided a dithering method for increasing the resolution of time intervals which can be output by a clocked digital circuit such as a microcontroller or microprocessor.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus for implementing a zero current detector for critical mode and discontinuous mode operation of a boost converter, and a method and apparatus for regulating the switching of the boost converter to eliminate the total harmonic distortion resulting energy stored in parasitic capacitance in the boost converter components. Specifically, the method and apparatus of the present invention are especially well-suited to the use of digital control of the boost converter.

The principles and operation of a zero current detector and method for control of a boost converter according to the present invention may be better understood with reference to the drawings and the accompanying description.

Figure 7:
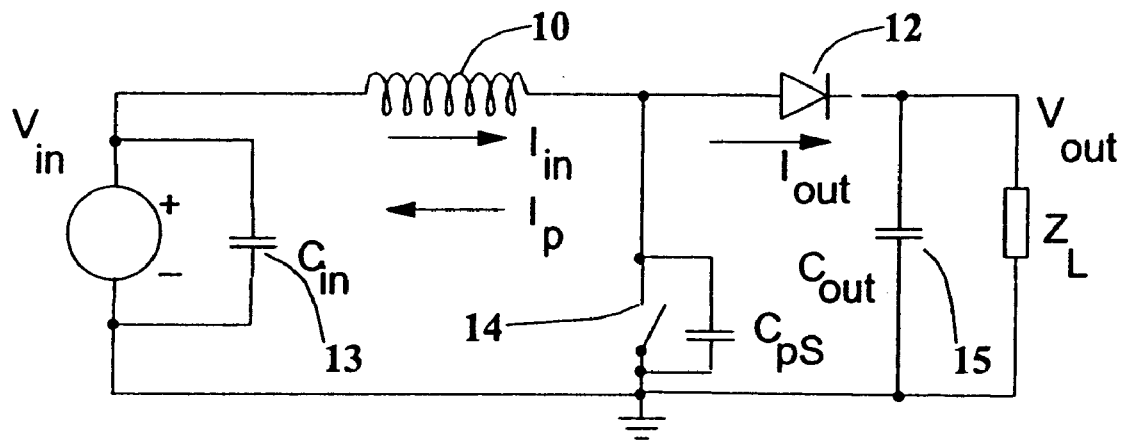
FIG. 7 shows the sources of parasitic capacitance in a boost converter.

Referring now to the drawings, FIG. 7 shows the sources of parasitic capacitance in a boost converter. A capacitance $C_{pS}$ is associated with boost switch 14. Note that parasitic capacitance $C_{pS}$ is not a separate component, nor is it part of the boost topology. Instead this parasitic capacitance is an inherent feature of existing components of the boost topology. For example, parasitic capacitance $C_{pS}$ typically arises because of the use of a switching transistor such as a metal-oxide-semiconductor field-effect transistor (MOSFET) for implementing boost switch 14. The MOSFET gate acts as the plate of a capacitor, the other plate of which is the MOSFET channel that effects the switching action of boost switch 14.

Figure 1:
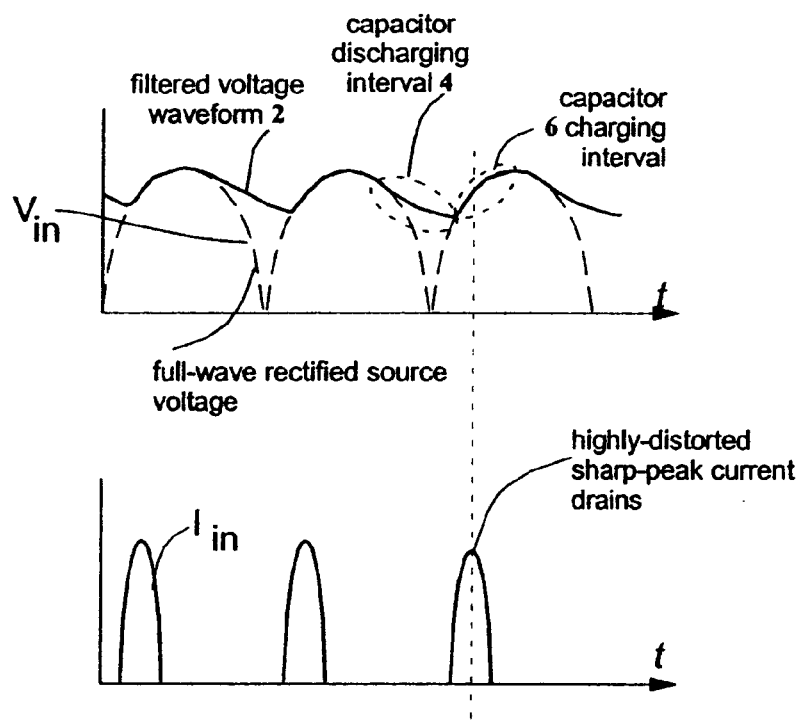
FIG. 1 shows the input voltage and current waveforms for a non-linear load which involves the charging of a capacitor, such as a power supply.
Figure 2:
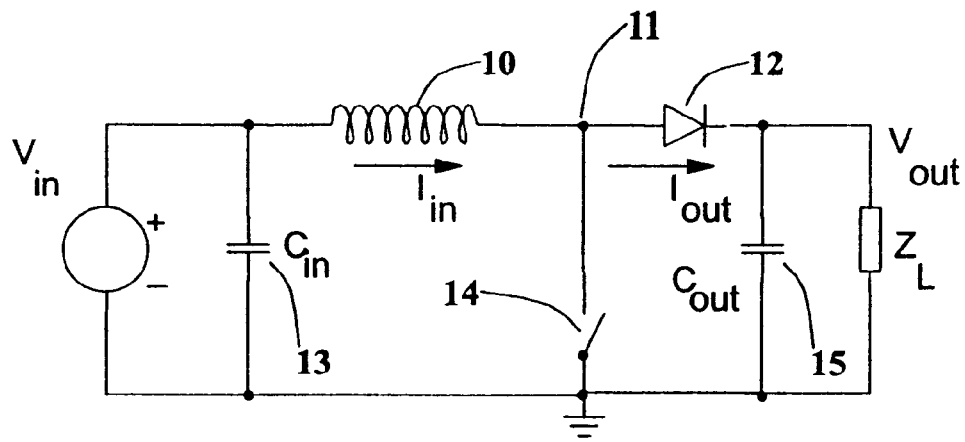
FIG. 2 shows the topology of a prior art boost converter.
Figure 3:
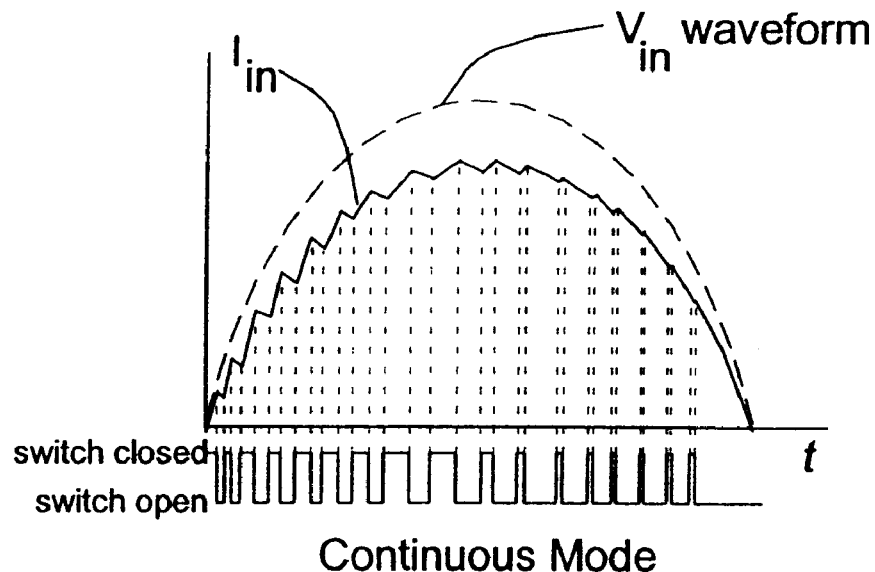
FIG. 3 shows the continuous mode of operation for a boost converter.
Figure 4:
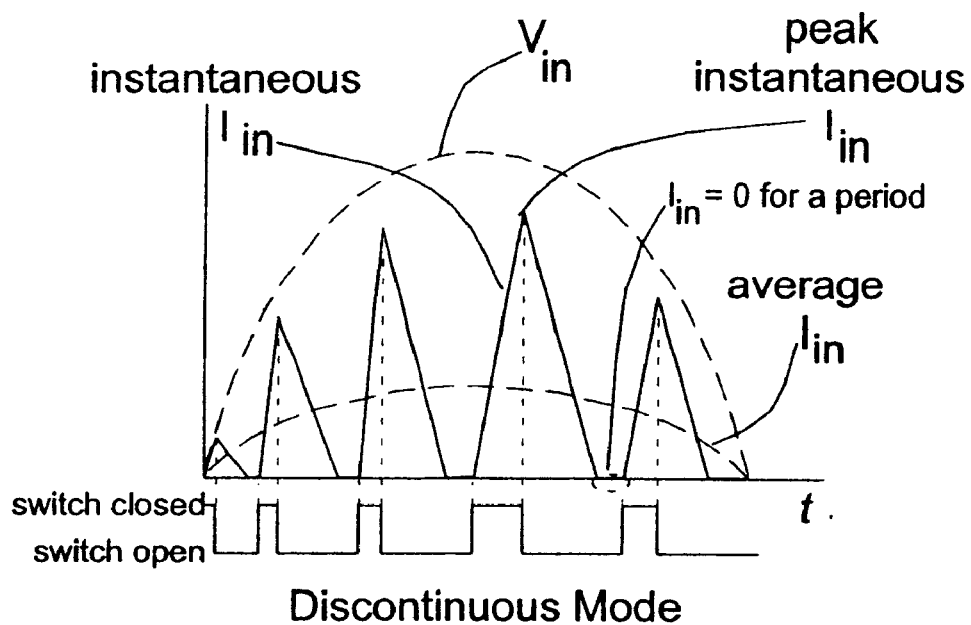
FIG. 4 shows the discontinuous mode of operation for a boost converter.
Figure 5:
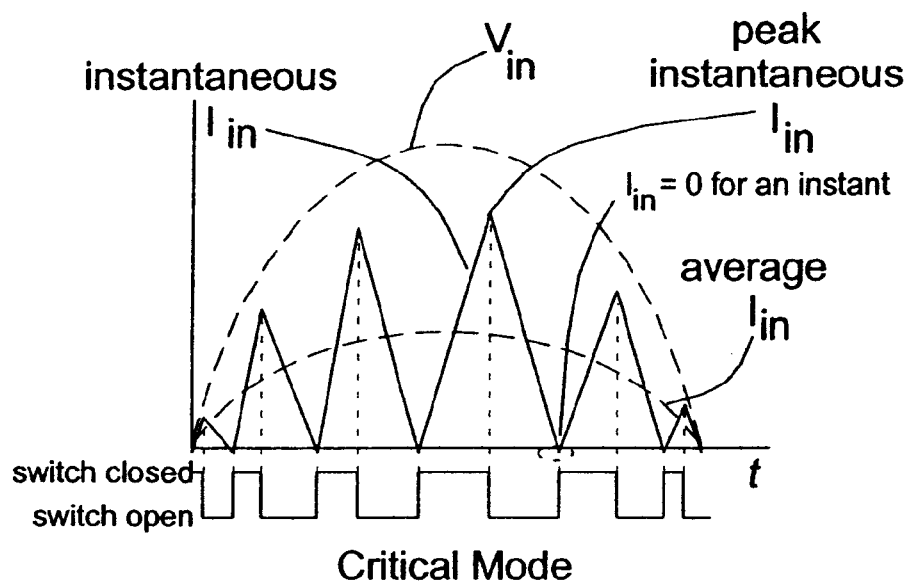
FIG. 5 shows the critical mode of operation for a boost converter.
Figure 6:
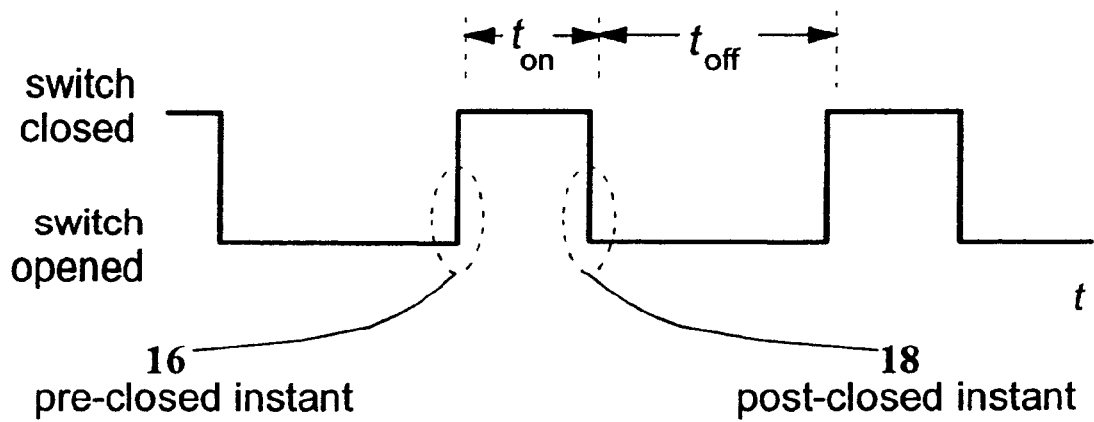
FIG. 6 shows the duty cycle, the pre-closed instant, and the post-closed instant of a boost converter boost switch.

FIG. 6 shows a typical duty cycle for a boost switch. There are two distinct cases in which parasitic capacitance $C_{pS}$ degrades the performance of a boost converter. In both cases boost switch 14 must be opened for parasitic capacitance $C_{pS}$ to affect the boost converter circuitry. As shown in FIG. 6, there is a pre-closed instant 16, which exists just prior to the closing of boost switch 14, and there is a post-closed instant 18, just after the opening of boost switch 14. Thus there is one case, hereinafter referred to as the "pre-closed instant case," where boost switch 14 is about to be closed, and there is another case, hereinafter referred to as the "post-closed instant case," where boost switch 14 has just been opened.

The pre-closed instant Case:

As is known in the art, an inductive circuit containing a parasitic capacitance will exhibit parasitic oscillations (parasitic resonances). In the case of the boost topology, these parasitic oscillations interfere with power factor correction at the pre-closed instant. To see this, consider the case where charge has been stored on parasitic capacitance $C_{pS}$ (FIG. 7) at the end of the inductive discharging of inductor 10. At this instant in time, current $I_{in}$ is zero, and for the critical mode of operation, this is the time when boost switch 14 should be closed in order to initiate an inductive charging of inductor 10 (hence the term "pre-closed instant"). However, because of the energy stored in parasitic capacitance $C_{pS}$, there is a parasitic oscillation which drives a current $I_p$ (FIG. 7) back into inductor 10. Current $I_p$ and therefore opposes the inductive $I_{in}$ and therefore opposes the inductive charging of inductor 10. Before the desired inductive charging of $I_{in}$ through inductor 10 can begin, the inductive discharging of $I_p$ in inductor 10 must be completed. If boost switch 14 is closed precisely at the instant of zero forward inductor current and the period of the inductive discharging of inductor 10 is of the same order as the time interval required for boost switch 14 to be closed for the inductive charging, then the inductive charging cannot take place properly. As an example, suppose the value $L_{in}$ of inductor 10 is of the order of 1 milliHenry, the voltage V across inductor 10 (due to the charge on $C_{pS}$) is of the order of −10 volts, and $I_p$ is of the order of 0.1 ampere. Since $$V = -L_{in}\frac{dI_p}{dt} \tag{1}$$

$$\frac{dI_p}{dt} = \frac{-V}{L_{in}} = 10^4 \tag{2}$$

so that $\Delta t$, the time interval required for the inductive discharging of inductor 10, will be of the order of $$\Delta t \approx \frac{I_p}{10^4} \approx 10^{-5} \sec \approx 10\mu\sec \tag{3}$$

Figure 8:
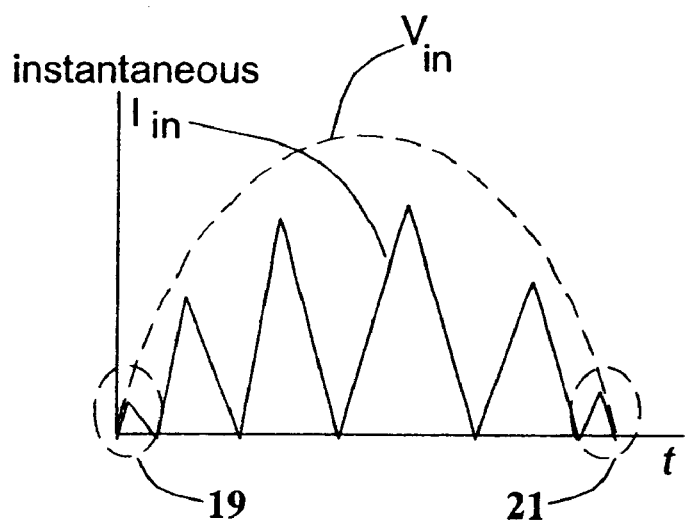
FIG. 8 shows the influence of parasitic capacitance.

If, however, the proper period for boost switch 14 to be closed is significantly smaller than $\Delta t$, such as only 5 μsec, then inductive charging of inductor 10 cannot take place. Such short inductive charging periods occur when the ratio $V_{in}/Z_L$ is small. FIG. 8 shows an interval 19 and an interval 21 in the waveform of $I_{in}$ where this effect, caused by parasitic capacitance interference with inductive charging, is most strongly pronounced. The inability to perform the proper inductive charging of inductor 10 leads to increased total harmonic distortion and degrades the power factor correction of the boost converter.

The method according to the present invention properly compensates for the parasitic capacitance and the associated parasitic resonance in the pre-closed instant case, as described below.

Figure 9:
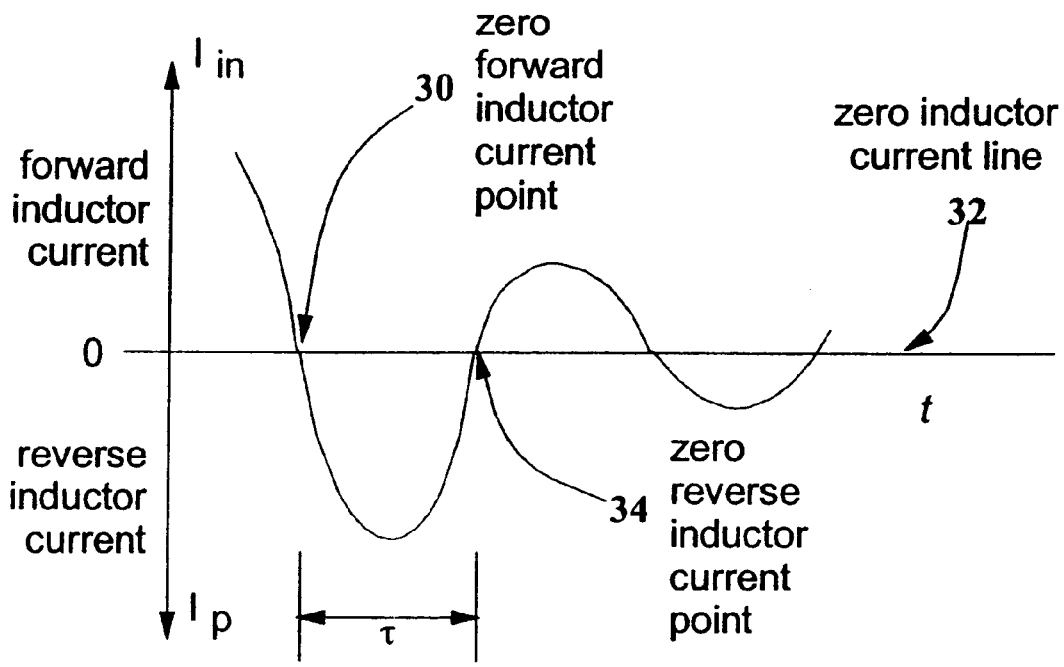
FIG. 9 shows inductor current ringing due to parasitic capacitance, and also shows the zero current points.

FIG. 9 shows a current flow which occurs in inductor current ringing and the zero current points associated therewith. Currents above a zero inductor current line 32 correspond to forward inductor current denoted as $I_{in}$ (FIG. 7), whereas currents below zero inductor current line 32 correspond to reverse inductor current $I_p$ due to parasitic capacitance $C_{pS}$ (FIG. 7). A zero forward inductor current point 30 is shown as well as a zero reverse inductor current point 34, which occurs after zero forward inductor current point 30 by a time interval delay τ, corresponding to half the period of the parasitic oscillation. An important difference between zero forward inductor current point 30 and zero reverse inductor current point 34 is the direction of the inductor current immediately after zero inductor current line 32 is crossed. In the case of zero forward inductor current point 30, the current which begins to flow immediately afterwards is $I_p$, a reverse inductor current, whereas the direction of the desired inductor current immediately after zero reverse inductor current 30 is a forward inductor current $I_{in}$. As described above, the parasitic oscillation due to parasitic capacitance $C_{pS}$ interferes with the inductive charging of inductor 10 because immediately after the zero current detector has detected zero forward inductor current point 30 (at which time boost switch 14 is closed according to the prior art) $I_p$ is beginning to flow as a reverse inductor current. According to the method of the present invention, however, the zero current detector detects zero reverse inductor current point 34 in addition to zero forward inductor current point 30. In a preferred embodiment of the present invention, boost switch 14 is closed when the zero current detector detects zero reverse inductor current point 34 instead of when the zero current detector detects zero forward inductor current point 30. In this preferred embodiment of the present invention, therefore, immediately after boost switch 14 is closed a forward inductor current begins to flow, which will aid the inductive charging of inductor 10, rather than oppose the inductive charging of inductor 10. There are no oscillations after boost switch 14 is closed. The inductor current is in the proper direction to build up energy. Thus, a preferred embodiment of the present invention is a method for controlling a boost converter in the critical mode which includes the steps of: (a) detecting the zero reverse inductor current point; and (b) closing boost switch 14 when the zero reverse inductor current point is detected. The use of this method according to the present invention will reduce the detrimental effects of parasitic capacitance, thereby reduce the total harmonic distortion, and thereby improve the power factor correction of the boost converter.

Figure 10:
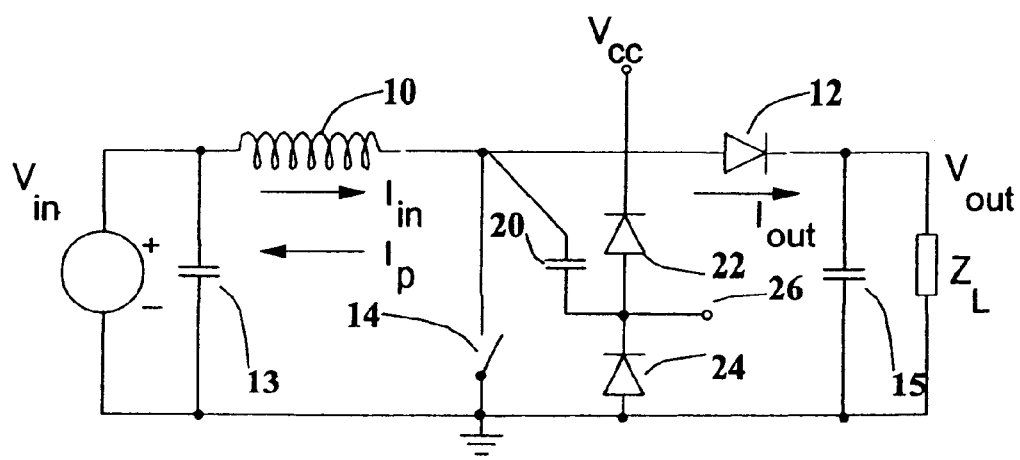
FIG. 10 shows a zero current detector according to the present invention.

In order to facilitate the use of the method of the present invention as described above, the apparatus of the present invention includes an innovative zero current detector, and embodiment of which is shown in FIG. 10. The zero current detector according to the present invention includes a capacitor 20 to isolate a zero current sense output point 26 from the voltage on inductor 10 and from output voltage $V_{out}$. A zero current sense output appears at zero current sense output point 26. The zero current sense output is a voltage level which indicates that zero inductor current has been detected. A diode 24 keeps the voltage of zero current sense output point 26 from going below ground potential and a diode 22 keeps the voltage of zero current sense output point 26 from going above a signal potential $V_{cc}$. The embodiment shown in FIG. 10 is a minimal configuration of a zero current detector according to the present invention, and consists solely of a capacitor and two diodes. An important property of the zero current detector according to the present invention is the ability to detect both zero forward inductor current as well as zero reverse inductor current. The zero current detector according to the present invention is also simpler and less expensive to implement than the zero current detectors of the prior art. Furthermore, the signal output by the zero current detector according to the present invention is a digital signal.

Figure 11:
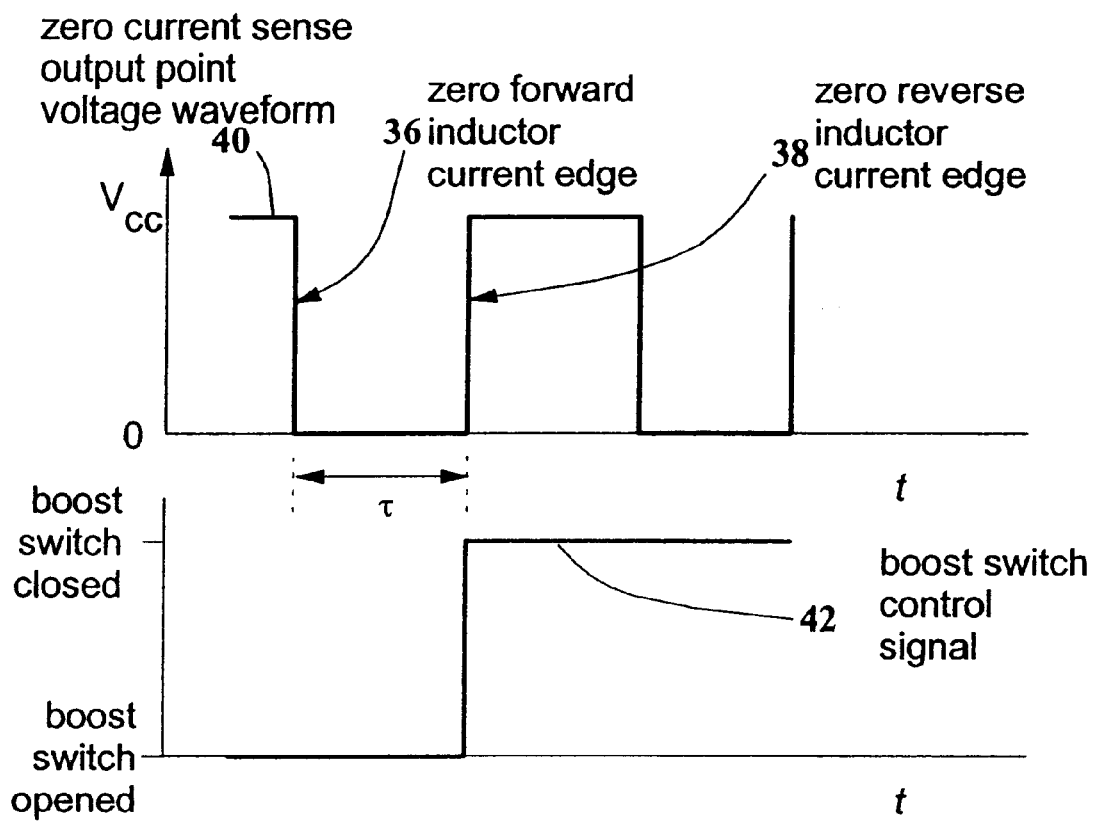
FIG. 11 shows the signal edges from the zero current detector according to the present invention.
Figure 12:
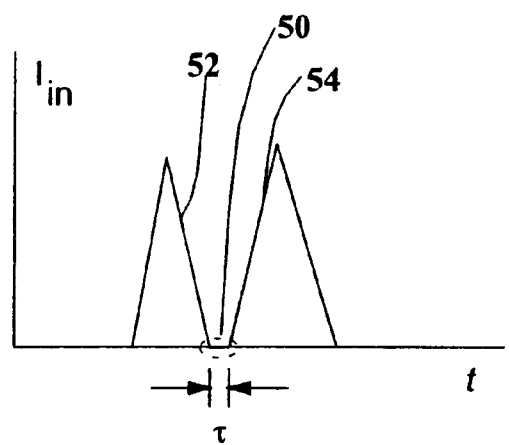
FIG. 12 shows the delay introduced into the critical mode timing by the method according to the present invention.

FIG. 11 shows a zero current sense output point voltage waveform 40 from zero current sense output point 26 (FIG. 10), a zero forward inductor current edge 36, and a zero reverse inductor current edge 38, which occurs after zero forward inductor current edge 36 by a time interval delay τ, corresponding to half the period of the parasitic oscillation. Also shown in FIG. 11 is a boost switch control signal 42 which derives the timing of its transition from boost switch opened to boost switch closed from zero reverse inductor current edge 38. FIG. 12 shows a time interval delay 50 between an inductive discharging interval 52 and an inductive charging interval 54. time interval delay 50 is introduced by the method according to the present invention, and corresponds to τ, half the period of the parasitic oscillation.

The post-closed instant Case:

When boost switch 14 is opened, parasitic capacitance $C_{pS}$ begins to charge and thereby absorbs energy which should go into load $Z_L$ (FIG. 7). When the ratio $V_{in}/Z_L$ is small, such as during interval 19 (FIG. 8) and interval 21 (FIG. 8), a significant amount of the energy goes into parasitic capacitance $C_{pS}$. This also leads to increased total harmonic distortion and reduced power factor correction of the boost converter.

Figure 13:
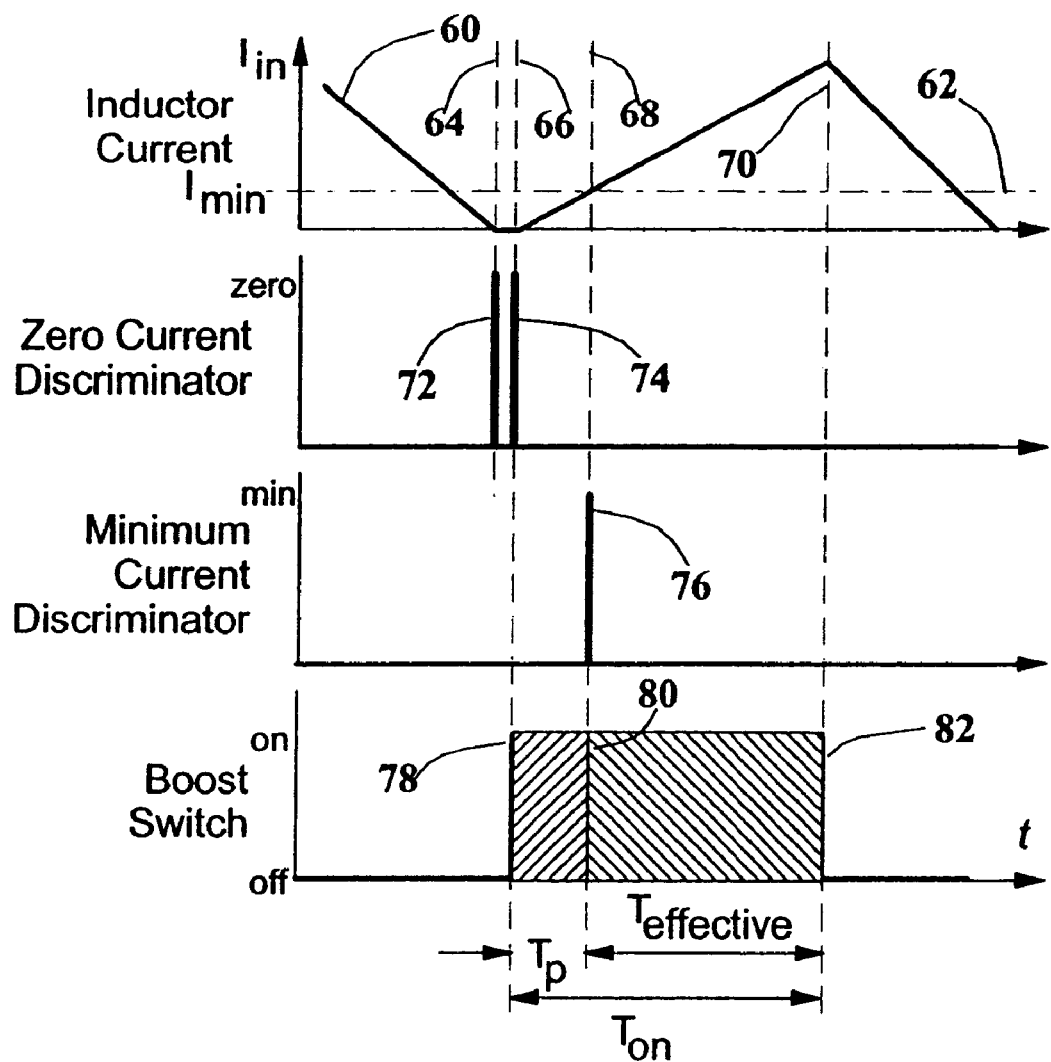
FIG. 13 shows the time interval delay for the post-closed instant.

FIG. 13, to which reference is now made, illustrates the method according to the present invention for compensating for the effects of the parasitic capacitance at the post-closed instant. The principle of the method is to extend the time interval during which boost switch 14 (FIG. 7) is closed, by a predetermined compensating time interval $T_p$ (FIG. 13), during which parasitic capacitance $C_{pS}$ (FIG. 7) is charged. The predetermined effective time interval for the closing of boost switch 14 (FIG. 7) to achieve the proper power factor correction is denoted as $T_{effective}$. Therefore, by extending the closing of boost switch 14 from an effective $T_{effective}$ to a total closed $$T_{on} = T_{effective} + T_p \qquad (4)$$

At absolute no load, $T_{effective}$ is decreased to zero, $T_{on}=T_p$. At this condition, which may occur during protection mode or stand-by mode, boost switch 14 closes each period, but inductor 10 does not charge enough to increase $V_{out}$. The alternating voltage across inductor 10 can be used as controller power supply.

the energy absorbed by parasitic capacitance $C_{pS}$ does not diminish the energy allocated to output load $Z_L$ (FIG. 7), and therefore parasitic capacitance $C_{pS}$ does not contribute to increased total harmonic distortion. The condition for predetermining compensating time interval $T_p$ is that after a time interval equal to compensating time interval $T_p$ the energy stored in inductor 10 must equal the energy stored in parasitic capacitance $C_{pS}$. That is, at the end of compensating time interval $T_p$:

$$\frac{V_{cp}^2 C_{pS}}{2} = \frac{V_{out}^2 C_{pS}}{2} = \frac{I_{min}^2 L}{2} \qquad (5)$$

where $V_{cp}$ is the voltage across parasitic capacitance $C_{pS}$ (FIG. 7), L is the inductance of inductor 10 (FIG. 7), and $I_{min}$ is the value of inductor current $I_{in}$ (FIG. 7) at the time when the condition of Equation (5) holds. Thus, compensating time interval $T_p$ is determined by a measurement of inductor current $I_{in}$ (FIG. 7), as described below.

Figure 14:
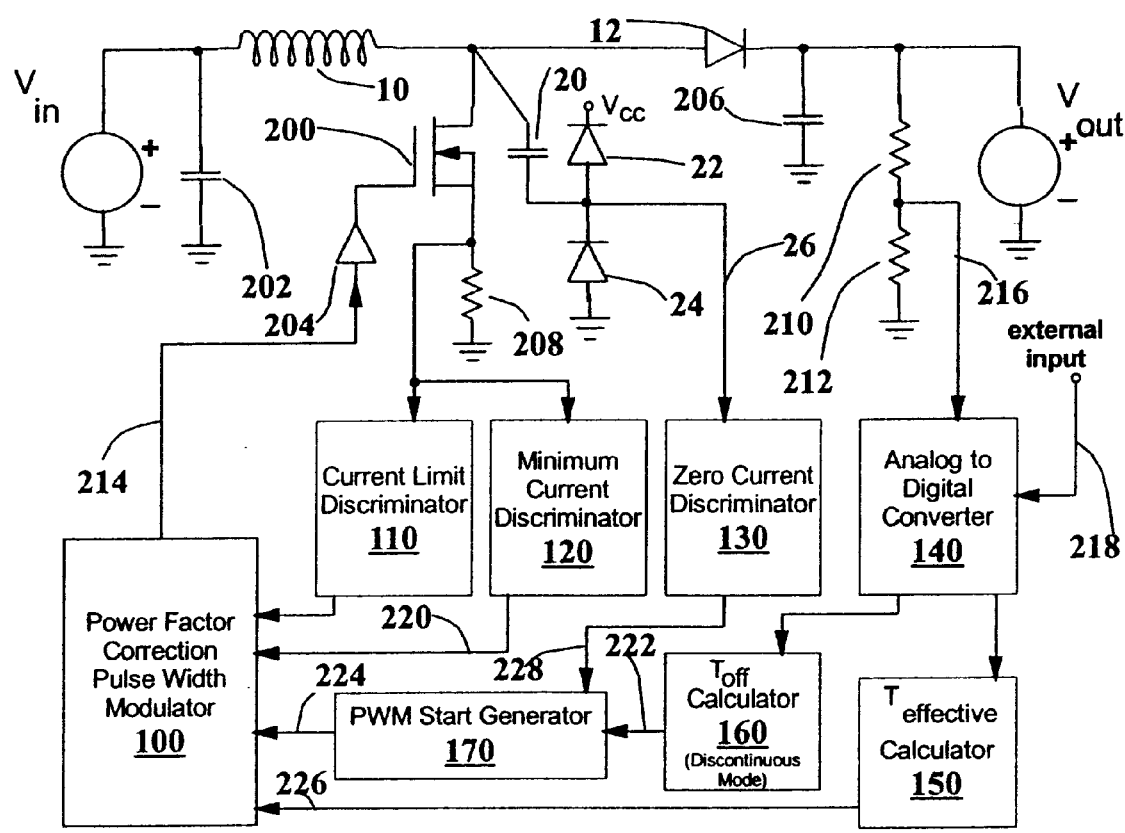
FIG. 14 is a functional block diagram of a control circuit according to the present invention.

FIG. 13 shows an inductor current waveform 60 as a function of time t. Inductor current waveform 60 has a zero forward inductor current time 64 and a zero reverse inductor current time 66. Inductor current waveform 60 reaches a peak at a peak inductor current time 70. The peak inductor current is predetermined in order to achieve a desired power factor correction. FIG. 13 also shows the minimum inductor current $I_{min}$, according to Equation (5), plotted as a line 62 which is intersected by inductor current waveform 60 at a minimum inductor current time 68. A zero forward inductor current pulse 72 and a zero reverse inductor current pulse 74 occur at zero forward inductor current time 64 and zero reverse inductor current time 66, respectively. zero forward inductor current pulse 72 and zero reverse inductor current pulse 74 are output from a zero current discriminator as described below (FIG. 14). FIG. 13 furthermore shows a minimum inductor current pulse 76 corresponding to minimum inductor current time 68. Minimum inductor current pulse 76 is output from a minimum current discriminator as described below (FIG. 14). compensating time interval $T_p$ is the time interval which elapses from zero reverse inductor current time 66 to minimum inductor current time 68, or, equivalently, from the time of zero reverse inductor current pulse 74 to the time of minimum inductor current pulse 76. FIG. 13 furthermore illustrates the controlling of boost switch 14 (FIG. 7) as a function of time t. boost switch 14 is closed at a starting closed time 78 corresponding to zero reverse inductor current time 64, or, equivalently, corresponding to zero reverse inductor current pulse 74. An ending closed time 82 is dynamically calculated to be the time interval from minimum inductor current time 68 which will provide for the correct inductive charging of inductor 10, according to the following equation (Unitrode application note U132, 1995, page 10–272):

$$T_{on} = \frac{4L \cdot P_{out}}{(V_{in}^2)_{peak}} \qquad (6)$$

where $P_{out}$ is the output power and $(V_{in}^2)_{peak}$ is the instantaneous peak of $V_{in}^2$.

Time 82 determines maximum inductor current time 70, and therefore the maximum of inductor current $I_{in}$. A total closed time interval $T_{on}$ during which boost switch 14 (FIG. 7) remains closed extends from time 78 until time 82. It is seen that Equation (4) holds for $T_{on}$, $T_{effective}$, and $T_p$. The minimum inductor current $I_{min}$, is predetermined in various ways, such as by calculation using Equation (5). The precise value of the parasitic capacitance of boost switch 14 is not known and varies from one application to another. Therefore, each application must be fine-tuned. The preferred embodiment according to the present invention is to predetermine minimum inductor current $I_{min}$ empirically as the value which yields the minimum total harmonic distortion.

In another embodiment of the present invention, starting closed time 78 begins at zero forward inductor current pulse 72 rather than at zero reverse inductor current pulse 74. In this manner, compensating time interval $T_p$ (which will always be larger than when starting closed time at zero reverse inductor current pulse 74) compensates for the effects of parasitic capacitance in both the post-closed instant and the pre-closed instant.

FIG. 14 is a functional block diagram of an embodiment of a device according to the present invention, which also incorporates the zero current detector of the present invention as described above. FIG. 14 also shows components and features of a boost converter which is being controlled by the circuit according to the present invention. Components and features of the boost converter include input voltage $V_{in}$, inductor 10, diode 12, and an output voltage $V_{out}$. A field-effect transistor 200 serves as the boost switch for the boost converter, and is controlled by a driver 204 whose input comes from a power factor correction pulse-width modulator 100 via a control line 214. In addition, there is a filter capacitor 202, and there is a filter capacitor 206 which smoothes output voltage $V_{out}$. The zero current detector according to the present invention includes capacitor 20, diode 22, and diode 24, as described above. The zero current sense output point 26 of the zero current detector is input into a zero current discriminator 130, which outputs logic-level pulses when zero current is detected. Note that the capacitance of capacitor 20 is added to the parasitic capacitance of field-effect transistor 200. Moreover, the current through field-effect transistor 200 is monitored by detecting the voltage drop across a resistor 208. The voltage from resistor 208 is input into a current limit discriminator 110 and a minimum current discriminator 120. minimum current discriminator 120 outputs a logic-level pulse when minimum current discriminator 120 determines that inductor current $I_{in}$ equals the predetermined minimum inductor current $I_{min}$. Likewise, current limit discriminator 110 outputs a logic-level pulse when the inductor current $I_{in}$ reaches a predetermined maximum limit. current limit discriminator 110 is a feature for safety purposes rather than power factor correction. Furthermore, output voltage $V_{out}$ is monitored by an analog-to-digital converter 140 via a monitoring line 216 from a voltage divider consisting of a resistor 210 and a resistor 212. analog-to-digital converter 140 also has an external input 218 for comparison to a external parameters.

For example, this circuit can be used to control lighting, and external input 218 could come from a light sensor to adjust voltage output $V_{out}$ to provide the proper level of intensity to maintain a desired ambient light level. The output from analog-to-digital converter 140 is input into a $T_{off}$ calculator 160 and a $T_{effective}$ calculator 150. When the circuit operates in the discontinuous mode, $T_{off}$ calculator 160 calculates the time interval that boost switch 200 should be kept opened so that the circuit will operate in the discontinuous mode. $T_{off}$ calculator 160 outputs the calculated time interval $T_{off}$ as a digitally-encoded number onto a data bus 222. When zero current discriminator 130 indicates via a control line 228 that the inductor current $I_n$ is at the appropriate zero value, a PWM start generator 170 waits the time interval delay calculated by $T_{off}$ calculator 160, and then signals power factor correction pulse-width modulator 100, via a control line 224, to close boost switch 200. When the circuit operates in the critical mode, there is no $T_{off}$ delay, and PWM start generator signals power factor correction pulse-width modulator 100 to begin as soon as zero current discriminator 130 indicates that the inductor current $I_{in}$ is zero. $T_{effective}$ calculator 150 calculates the time interval that boost switch 200 should be closed without regard to the effects of parasitic capacitance, and outputs the calculated time interval $T_{effective}$ as a digitally-encoded number onto a data bus 226. If there were no effects of parasitic capacitance, then time interval $T_{effective}$ would be the proper time interval for boost switch 200 to be closed. Because there is parasitic capacitance, however, the time interval for boost switch 200 to be closed must be extended from $T_{effective}$ to $T_{on}$, as shown in Equation (4), Equation (5), and FIG. 13. This extension of the time interval for boost switch 200 to be closed is accomplished by having power factor correction pulse-width modulator 100 wait until minimum current discriminator 120 has signaled, via control line 220, that the minimum inductor current $I_{min}$ has been reached before beginning to count down time interval $T_{effective}$. In summary, the sequence involves closing the boost switch, waiting until the minimum current discriminator determines that the inductor current is equal to the minimum inductor current, commencing effective time interval $T_{effective}$, waiting until the end of effective time interval $T_{effective}$, and then opening the boost switch.

Note that FIG. 14 is a functional block diagram, in that one or more of the components indicated as blocks need not be physically separate components. Certain integrated components, such as programmable digital microcontrollers and microprocessors, contain the logic and support circuitry to implement many or all of the functional blocks shown in FIG. 14. Integrating many or all of the functional units shown in FIG. 14 into a single component serves to reduce manufacturing costs significantly. An additional advantage in integrating these components into a programmable controller is that such a device can easily change the operating mode of the boost converter from critical mode to discontinuous mode as circumstances warrant. Such a power factor correction device can adapt to operating and load conditions that fluctuate heavily. In particular, the discontinuous mode is advantageous to use at low output power levels.

Figure 15:
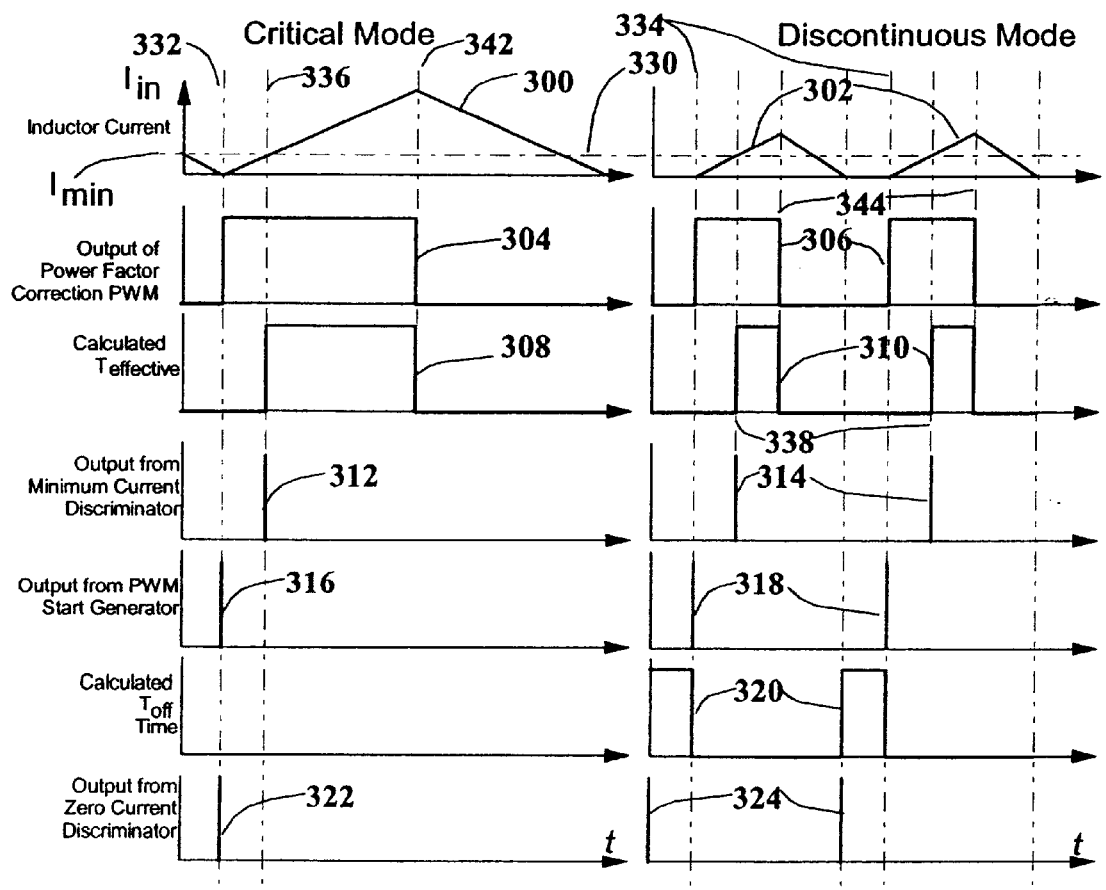
FIG. 15 is a timing chart of the control circuit according to the present invention.

FIG. 15 shows a timing chart of the circuit shown in FIG. 14, for operation in both the critical mode and the discontinuous mode. The waveforms of FIG. 15 correspond to those of FIG. 13 and are correlated to the circuit of FIG. 14. A waveform 300 shows inductor current $I_{in}$ for the critical mode, and a waveform 302 shows inductor current $I_{in}$ for the discontinuous mode. A horizontal line 330 represents the minimum inductor current $I_{min}$, and the time of zero reverse inductor current is indicated by a vertical line 332 for the critical mode and by vertical lines 334 for the discontinuous mode. The time at which inductor current $I_{in}$ reaches minimum inductor current $I_{min}$ is indicated by a vertical line 336 for the critical mode and by vertical lines 338 for the discontinuous mode. The time at which inductor current $I_{in}$ reaches the maximum desirable value is indicated by a vertical line 342 for the critical mode and by vertical lines 344 for the discontinuous mode. The output of power factor correction pulse-width modulator 100 on control line 214 (FIG. 14) is shown by a waveform 304 for the critical mode and by a waveform 306 for the discontinuous mode. The desired time interval for $T_{effective}$ which is calculated by $T_{effective}$ calculator 150 and output onto data bus 226 (FIG. 14) is shown as a waveform 308 for the critical mode and as a waveform 310 for the discontinuous mode. The output of minimum current discriminator 120 on a signal line 220 (FIG. 14) is shown as a pulse 312 for the critical mode and as pulses 314 for the discontinuous mode. The output of PWM start generator 170 on signal line 224 (FIG. 14) is shown as a pulse 316 for the critical mode and as pulses 318 for the discontinuous mode. The calculated time interval $T_{off}$ is applicable to the discontinuous mode only. The output from $T_{off}$ calculator 160 on data bus 222 (FIG. 14) is shown as a waveform 320 for the discontinuous mode. The output of zero current discriminator 130 via control line 228 (FIG. 14) is shown as a pulse 322 for the critical mode and as pulses 324 for the discontinuous mode.

Because clocked digital circuits are employed in embodiments of the present invention to implement power factor correction pulse-width modulator 100 (FIG. 14) it may be necessary to improve the time resolution of clocked digital circuits to meet the requirements of determining time interval $T_{effective}$, time interval $T_{on}$, and time interval $T_{off}$. The method according to the present invention for doing so is illustrated by means of example as follows. Suppose it is necessary to have a resolution of 1 microsecond, but the particular clocked digital circuit of pulse-width modulator 100 has a resolution of only 5 microseconds. That is, for effective power factor correction it is necessary, for example, that $T_{effective}$ be a time interval selected from values of 30 microseconds, 31 microseconds, 32 microseconds, 33 microseconds, and so on, rather than merely selected from values of 30 microseconds, 35 microseconds, 40 microseconds, and so on, which would normally be the limits of the particular clocked digital circuit utilized for pulse-width modulator 100. Because the duty cycle for boost switch 200 continues throughout the operation of the apparatus, minor variations in the duty cycle will be averaged by the physical processes of the operation (such as the inductive charging and inductive discharging). Also, because the frequency of the duty cycle is significantly higher than that of the input current which is to be shaped, this averaging will take place over a time interval which is small compared to the period of the input current. These factors mean that dithering will be useful in improving the resolution of a clocked digital circuit used to implement pulse-width modulator 100. The present application uses the term "dithering" to denote the combining of different discrete values in order to approach continuous values by or through any process involving physical averaging. A commonly-encountered example of dithering is the use of "half-tone" images to produce varying shades of gray solely from black and white. The different discrete values ("black" and "white") are combined in through the use of the half-tone dots, and the physical averaging is done by the human eye as it views the image from a suitable distance. The method according to the present invention employs dithering in time to increase the resolution of a clocked digital circuit used in a pulse-width modulator for power factor correction. Suppose that a time interval of 32 microseconds is needed for time interval $T_{effective}$ in the above example. The closest natural time intervals available from the clocked digital circuit of this example are 30 microseconds and 35 microseconds. By taking a sequence of 5 consecutive duty cycles with time interval $T_{effective}$ as follows: 30 microseconds, 35 microseconds, 30 microseconds, 35 microseconds, 30 microseconds, it is seen that the average time interval $T_{effective}$=32 microseconds, as desired. In general, let the minimum time interval from a clocked digital circuit be denoted as τ. Then the different natural time intervals are τ, 2τ, 3τ, . . . , nτ, (n+1)τ, . . . Suppose it is desired to produce a time interval between nτ and (n+1)τ. Denote this desired time interval as n'τ, such that n<n'<n+1. Choose a convenient number of consecutive duty cycles, and denote this number by m. The dithering is determined by how many duty cycles should have time interval $T_{effective}$=nτ and how many should have time interval $T_{effective}$=(n+1)τ. Denote the number of duty cycles having time interval $T_{effective}$=nτ as k. Then the number of duty cycles having time interval $T_{effective}$=(n+1)τ is (m-k). To determine k note that the averaging requires:

$$\frac{nk + (n+1)(m-k)}{m} = n' \quad (7)$$

which reduces to:

$$k = m(n+1-n') \quad (8)$$

The larger m becomes the more accurately k may be chosen. The value of m should be chosen so that the dithering is reasonably accurate, but the number of consecutive duty cycles should be kept small enough that the averaging takes place over a period that is small compared to the input current period. In the numerical example given above, τ=5 microseconds, n=6 (30 microseconds), τ+1=7 (35 microseconds), n'=6.4 (32 microseconds), and m=5. Applying Equation (8), it is seen that k=3 and m-k=2, giving the sequence 30 microseconds, 35 microseconds, 30 microseconds, 35 microseconds, 30 microseconds. The different time interval values should be intermixed as uniformly as possible for a given distribution.

In summary, this dithering method allows a clocked digital circuit which generates discrete time intervals to generate a duty cycle for use in a pulse-width modulator for power factor correction, where the time interval of a state of the duty cycle is intermediate between two adjacent discrete time intervals which can be generated by the clocked digital circuit. The present application uses the term "adjacent" in the context of two discrete values to denote that there is no discrete value intermediate between the adjacent values; that is, an "intermediate" value is less than the greater of the two adjacent discrete values, but greater than the lesser of the two adjacent discrete values. The dithering method consists of constructing a group of (more than one) consecutive time intervals, the time intervals of which are selected from among the discrete time intervals of the clocked digital circuit, such that the average of the time intervals of the group will approximate the desired time interval or the state of the duty cycle.

While the invention has been described with respect to a limited number of embodiments, it will be appreciated that many variations, modifications and other applications of the invention may be made.

What is claimed is:

1. A zero current detector for a boost converter, the boost converter including a boost switch with a first connection to an inductor having an inductor current, the zero current detector operative to detecting zero inductor current, the zero current detector comprising:

(a) a capacitor connected to the first connection;

(b) a first diode with a second connection to said capacitor and a third connection to the boost switch;

(c) a second diode connected to said second connection; and (d) a zero current sense output point at said second connection.

2. The zero current detector as in claim 1, further operative to the detection of zero forward inductor current and zero reverse inductor current.

3. A method for controlling a boost converter for power factor correction, the boost converter having a boost switch and an inductor with an inductor current, the method comprising the steps of:

(a) providing a zero current detector operative to the detection of zero reverse inductor current; and (b) closing the boost switch when said zero current detector detects said zero reverse inductor current.

4. A method for controlling a boost converter for power factor correction, the boost converter having a boost switch and an inductor current, the boost switch having an effective time interval for being closed, the method comprising the steps of:

(a) predetermining a minimum inductor current;

(b) providing a minimum current discriminator, said minimum current discriminator operative to determining that the inductor current is equal to said minimum inductor current;

(c) closing the boost switch;

(d) waiting until said minimum current discriminator determines that the inductor current is equal to said minimum inductor current;

(e) commencing the effective time interval;

(f) waiting for the completion of the effective time interval; and (g) opening the boost switch.

5. A method for using a clocked digital circuit to generate a duty cycle for use in a pulse-width modulator for power factor correction, the clocked digital circuit operative to generating a plurality of discrete time intervals, the duty cycle having at least one state with an intermediate time interval distinct from any of the discrete time intervals generated by the clocked digital circuit, the method comprising the step of constructing a group of a plurality of time intervals selected from the plurality of discrete time intervals generated by the clocked digital circuit, such that the average of the time intervals of said group approximates the intermediate time interval.

6. A method for controlling a power converter having an inductor and a switching transistor, the switching transistor being coupled from one end of the inductor to a common voltage potential, the inductor having an inductor current capable of being substantially zero flowing in either direction, the method comprising the steps of:

(a) detecting when the inductor current increases from the reverse direction and reaches zero; and (b) turning on the switching transistor.

7. A method for controlling a power converter for providing power factor correction, the power converter including an inductor having an inductor current and a stored inductor energy, and a switching transistor having a parasitic capacitance storing a parasitic capacitance energy, the switching transistor being coupled from one end of the inductor to a common voltage, the method comprising the steps of:

(a) determining a predetermined effective time interval during which the switching transistor should remain on to achieve a desired power factor correction;

(b) determining a minimum value for the inductor current which would result in the stored inductor energy being substantially equal to the parasitic capacitance energy;

(c) turning on the switching transistor;

(d) commencing a measurement of elapsed time when the inductor current reaches said minimum value; and (e) turning off the switching transistor when said elapsed time substantially equals said predetermined effective time interval.

8. A method for controlling a duty cycle of a switching power converter using a clocked digital circuit driven by a digital clock having a fixed clock period, the method comprising the steps of:

(a) determining a desired duty cycle time period;

(b) determining a lower number of clock periods having a sum lower than said desired duty cycle time period;

(c) determining a higher number of clock periods having a sum higher than said desired duty cycle time period;

(d) adjusting the duty cycle of the switching power converter to have a first time period equal to the sum of the lower number of clock periods for a first number of cycles; and (e) adjusting the duty cycle of the switching power converter to have a second time period equal to the sum of the higher number of clock periods for a second number of cycles, wherein an average time period of said first number of cycles each having said first time period and said second number of cycles each having said second time period is substantially equal to said desired duty cycle time period.

9. A zero current detector for a power converter having an inductor and a switching transistor, the switching transistor being coupled from one end of the inductor having an inductor current to a common voltage, the zero current detector circuit comprising:

(a) a capacitor having a first end and a second end, said first end being coupled to the one end of the inductor;

(b) a first diode having a first anode and a first cathode, said first anode being coupled to the common voltage and said first cathode being coupled to said second end of said capacitor;

(c) a second diode having a second anode and a second cathode, said second anode being coupled to said second end of said capacitor and said second cathode being coupled to a higher voltage than the common voltage, the zero current detector producing an output voltage at said second end of said capacitor indicative of the inductor current.

10. The zero current detector as in claim 9, wherein the inductor has an inductor current ranging over negative, zero, and positive values, the zero current detector being adapted so that said output voltage has a first level when the inductor current ranges over a positive value, and so that said output voltage has a second level when the inductor current ranges over a negative value.

11. The zero current detector of claim 10, wherein said first voltage level is substantially equal to said higher voltage, and said second voltage level is substantially equal to the common voltage.

12. The zero current detector of claim 10, wherein said output voltage is adapted to transition from said first level to said second level when the inductor current decreases from a positive value and substantially reaches a zero value.

13. The zero current detector of claim 10, wherein said output voltage is adapted to transition from said second level to said first level when the inductor current increases from a negative value and substantially reaches a zero value.

14. A power converter for providing power factor correction, the power converter comprising:

(a) an inductor having an inductor current, said inductor current ranging over negative, zero, and positive values;

(b) a switching transistor having a parasitic capacitance, the switching transistor being coupled from one end of said inductor to a common voltage;

(c) a zero current detector adapted to output a zero current sense output when said inductor current is substantially zero;

(d) a minimum current discriminator adapted to output a minimum current signal when said inductor current reaches a predetermined value;

(e) a timing circuit adapted to output a timing signal at the end of a predetermined effective time interval after being activated;

(f) a pulse-width modulator for turning on and turning off said switching transistor, said pulse-width modulator receiving said zero current signal, said minimum current signal, and said timing signal, said pulse-width modulator being adapted to:

i) turn on said switching transistor when said zero current sense output is received;

ii) activate said timing circuit when said minimum current signal is received; and iii) turn off said switching transistor when said timing signal is received.

* * * * *